United States Patent [15] 3,668,659
Hutchings [45] June 6, 1972

[54] TOUCH-WIRE DETECTION SYSTEMS

[72] Inventor: Leonard Henry Hutchings, Liverpool, England

[73] Assignee: Plessey Handel Und Investments A.G., Zug, Switzerland

[22] Filed: Dec. 10, 1970

[21] Appl. No.: 96,845

[30] Foreign Application Priority Data

Dec. 12, 1969 Great Britain......................60,684/69

[52] U.S. Cl. ............................................340/365, 178/17 C
[51] Int. Cl............................................................G08c 1/00
[58] Field of Search.....................340/365, 258 C; 179/90 K; 178/17 C, 17.5, 79; 197/98; 200/DIG. 1

[56] References Cited

UNITED STATES PATENTS

| | | | |
|---|---|---|---|
| 2,659,533 | 11/1953 | Quinby et al. | 340/365 |
| 3,482,241 | 12/1969 | Johnson | 340/365 |

*Primary Examiner*—John W. Caldwell
*Assistant Examiner*—Robert J. Mooney
*Attorney*—Scrivener, Parker, Scrivener & Clarke

[57] ABSTRACT

Each touch-wire consists of a pair of contacts and touch is sensed in an operational amplifier by detecting the effect of the direct current change resulting from placing a human finger across the contacts, the contacts having a potential difference between them. The operational amplifier, connected in a current summation mode, is used to produce a voltage change as a function of the change in current at the summation point. The voltage change is amplified by the operational amplifier before being applied to a logic-level clamp.

5 Claims, 6 Drawing Figures

TOUCH-WIRE DETECTION SYSTEMS

The present invention relates to the electrical detection of human touch and is more particularly concerned with the provision of such a detection mechanism for incorporation in so-called "touch-wire displays."

It is an object of the invention to provide a touch-wire detection system which is relatively inexpensive and efficient and which may be associated with a remotely situated touch-wire display and which does not produce radio-frequency interference.

According to the invention there is provided an electrical device for sensing the application of human-touch to a touch contact in which said touch contact is formed by a pair of electrically separated conductors, one of said conductors being connected, as a virtual earth point to one of the inputs of a two input operational amplifier, whereas the other one of said conductors is connected to a source of potential and the other input of said operational amplifier is connected to a reference bias source and in which said operational amplifier is operated in current summation mode to detect the current change resulting from the activation of said touch contact, by the application of an electrical resistance component of a human finger or the like placed across said pair of conductors, said operational amplifier being arranged to provide a discrete output voltage level on an output lead indicative of said current change.

Figure 1:
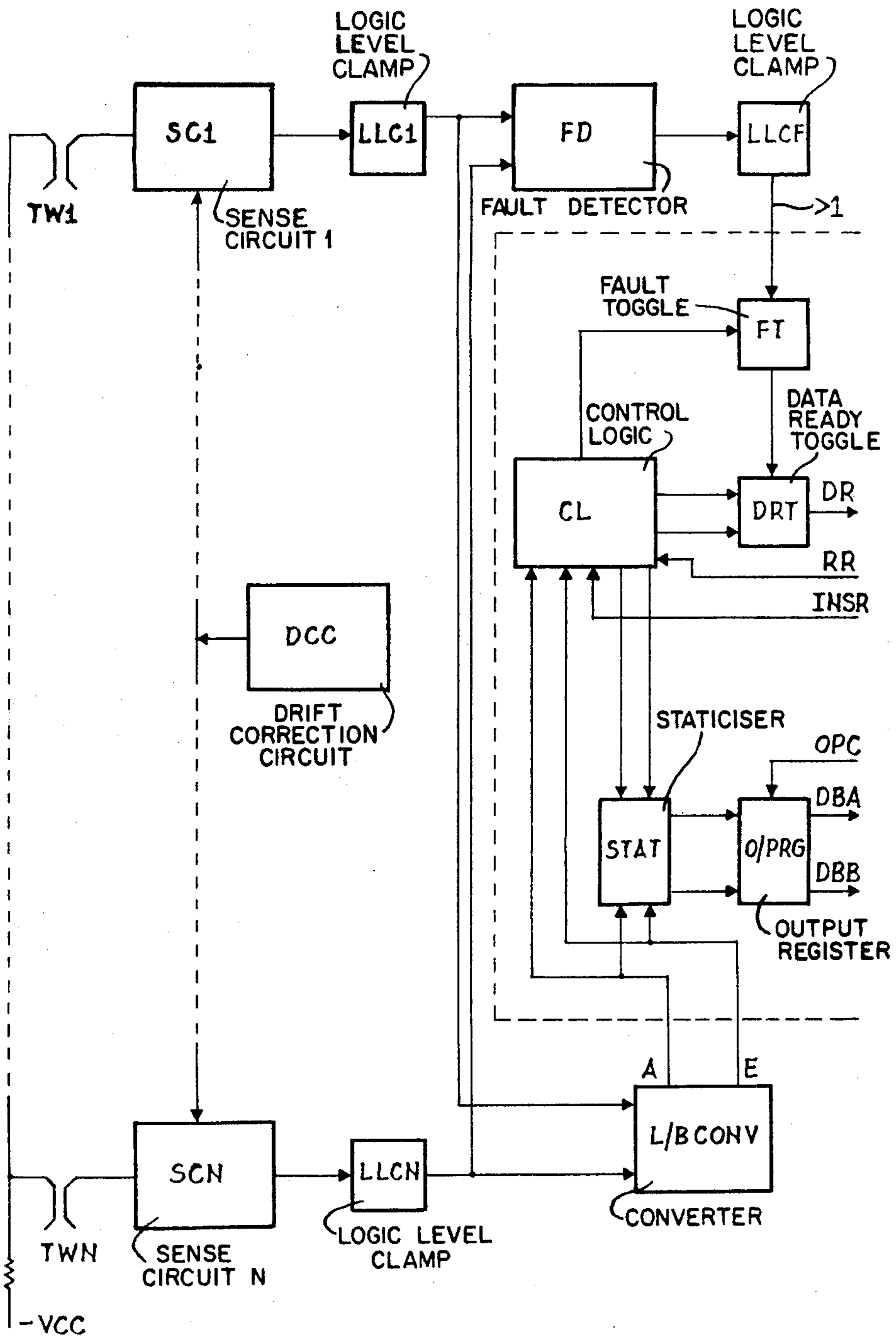
Figure 2:
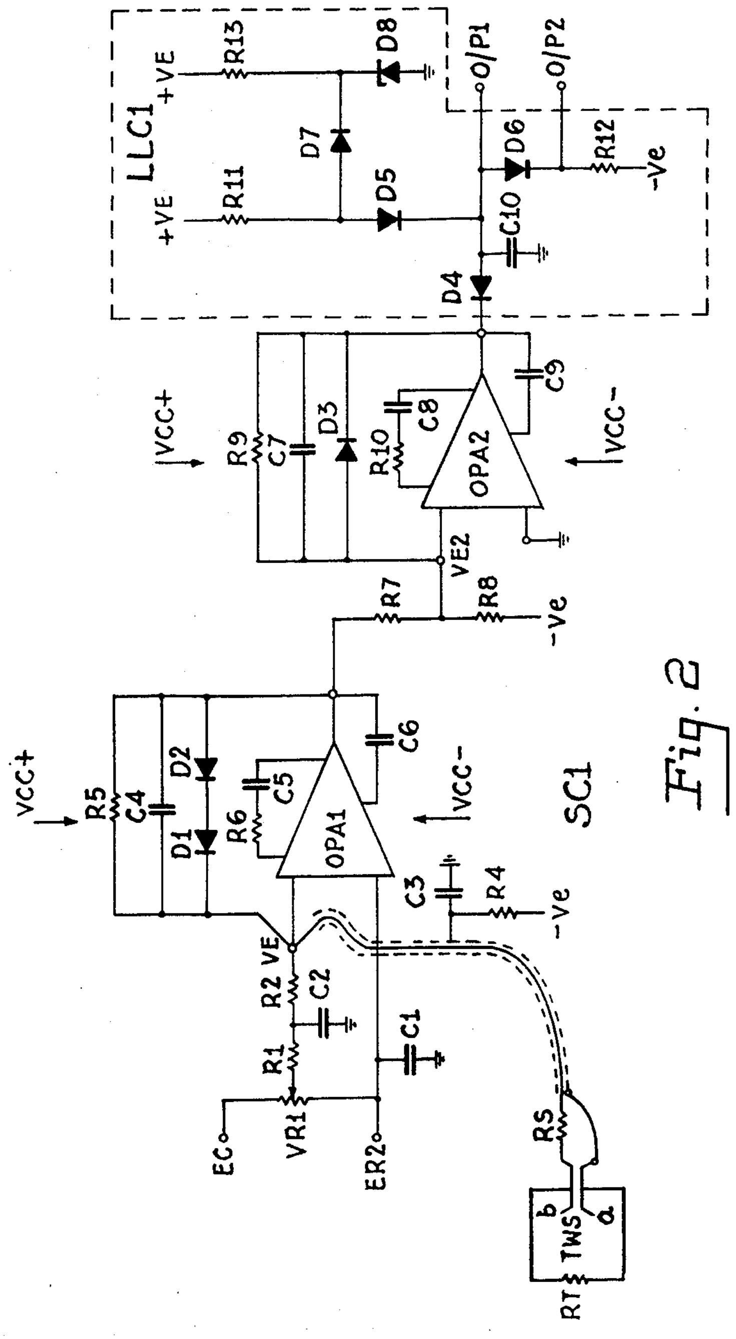
Figure 3:
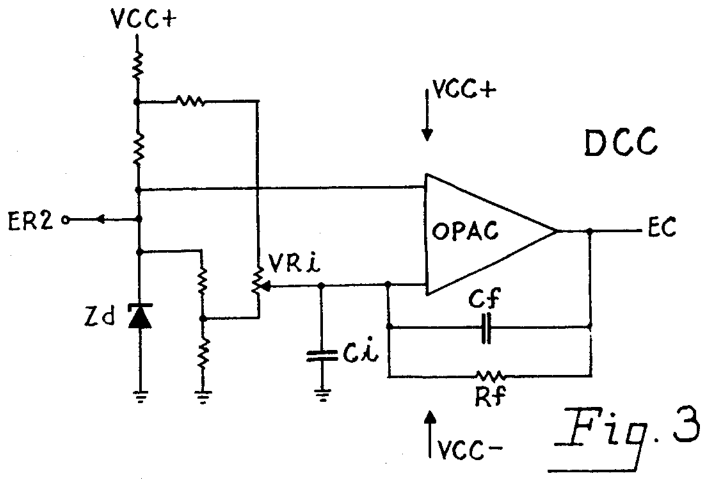
Figure 4:
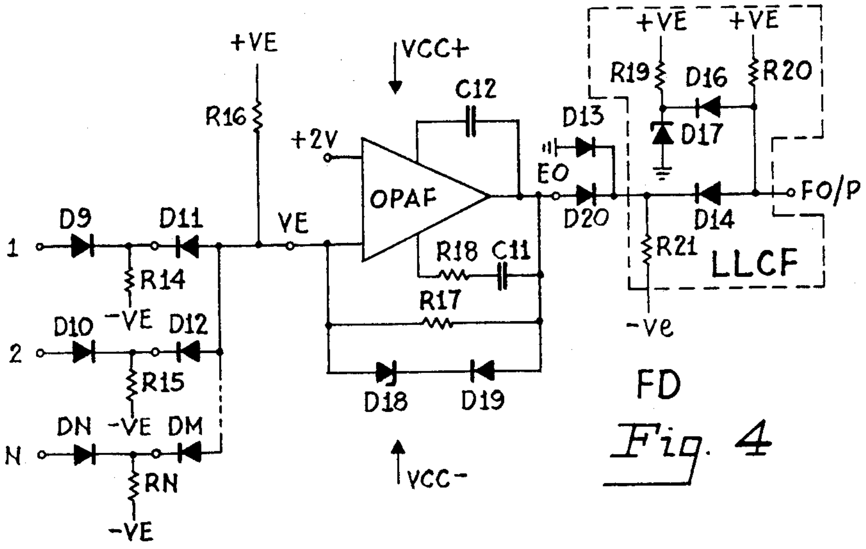
Figure 6:
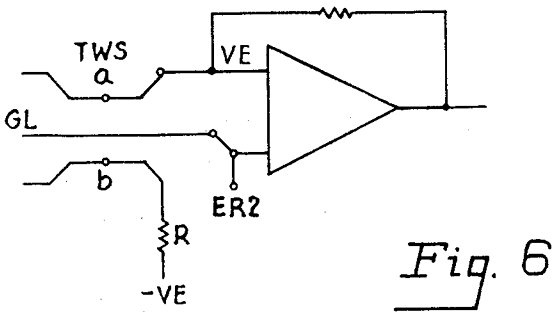
Figure 5:
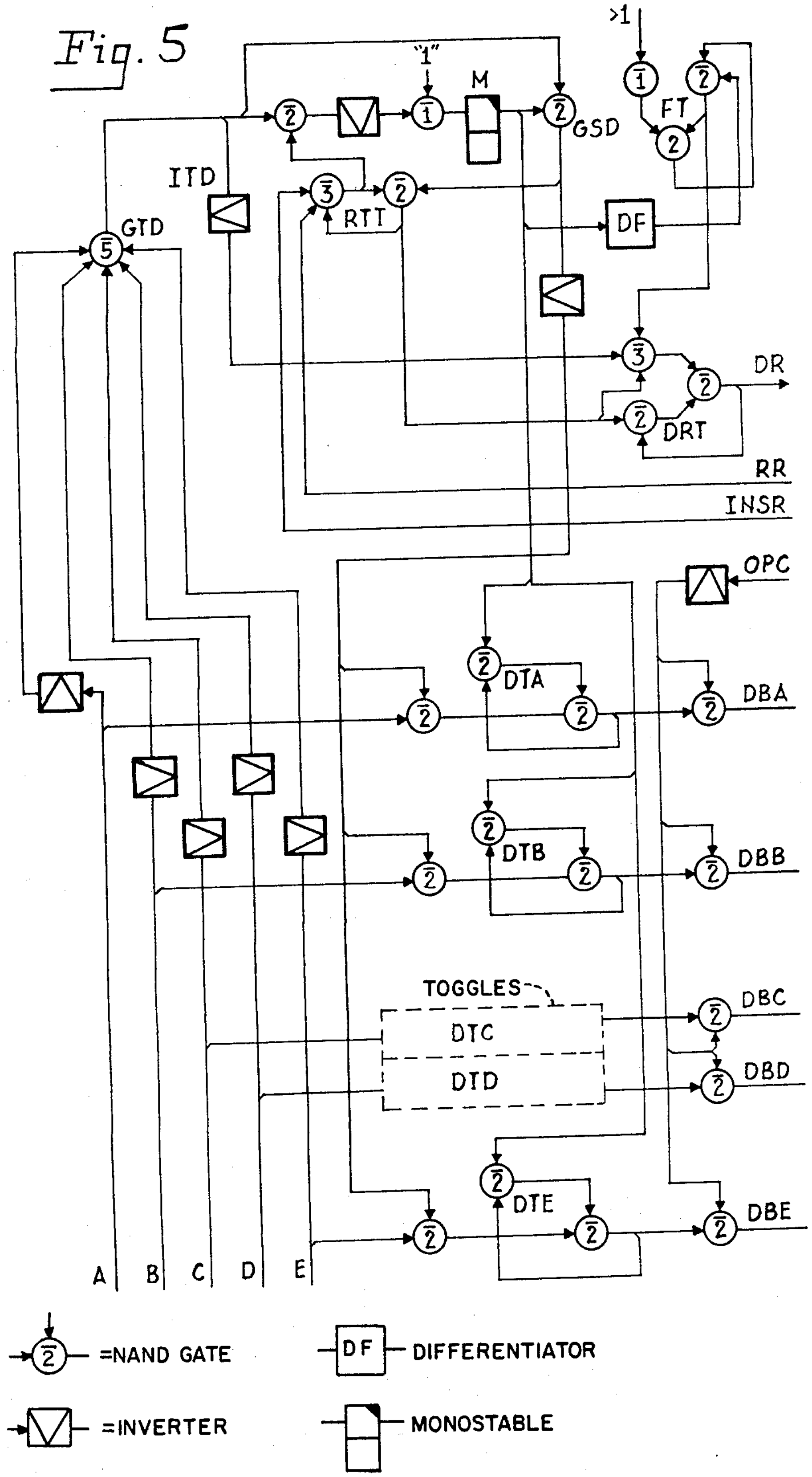

The invention together with its various features will be described with reference to the accompanying drawings. Of the drawings:

FIG. 1 shows a block diagram of the touch wire detection system of the invention, FIG. 2 shows the sensing circuitry for each touch wire, FIG. 3 shows a drift correction circuit for use with the sense circuits of FIG. 2, FIG. 4 shows a fault detection circuit for use in conjunction with the invention, FIG. 5 shows the logic diagram of the touch-wire identification circuitry while FIG. 6 shows an alternative arrangement for the sensing circuitry of FIG. 2.

GENERAL EXPLANATION

The touch is sensed by detecting the effect of the current change resulting from placing a human finger across two conductors, having a potential difference between them; both conductors having a low impedance with respect to earth.

An 'operational amplifier', connected in a current summation mode, is used to produce a voltage change as a function of the change in current to the summation point. This voltage change is amplified before being applied to a logic-level clamp as shown in FIG. 1.

One sense circuit such as SC1 per touch-point such as TW1 is provided, and the logic outputs of each sense circuit after clamping in logic level clamp circuits such as LLC1, are applied to digital circuitry (shown within the dotted box of FIG. 1) after conversion to binary code form by converter L/B CONV. The digital circuitry consists of a set of data staticisers STATS, for receiving a code indicative of the touch wire contact touched, and control logic CL. The logic level circuitry will be described in more detail with reference to FIG. 5.

If more than one touch is made simultaneously, in error, this is detected by an analogue fault detection circuit FD to which all the Sense circuits SC1 to SCN are connected, and which also uses a current summation technique. This circuit will be described in more detail with reference to FIG. 4. The logic-level output from the 'Fault Detection' circuit FD is used to set a Fault bistable FT associated with the control logic CL.

The control logic CL is arranged such that any touch having a duration less than a specified period is rejected. If the touch is maintained for a greater period, however, the binary coded data are staticised in the staticiser STATS and when the touch ends, the Data Ready bistable DRT is set. The data ready bistable DRT is reset by the equipment to which the data outputs are connected over lead RR, after the data have been accepted by that equipment. Leads DBA to DBE are controlled from a reading point of view by the output control lead OPC.

In the event of more than one touch occurring simultaneously, setting of the data read bistable DRT is inhibited and neither touch is effective. In this case, the Fault bistable FT is reset at the commencement of the next touch, the remainder of the cycle being normal.

CIRCUIT DETAILS

Sense Circuit (See FIG. 2)

It will be seen that one touch-wire TWSa is connected to a negative potential −ve (for the example shown), and the other touch-wire TWS *b* is connected via resistor RS to the virtual earth (current summation) point V.E. of the operational amplifier OPA1.

When the operator's finger 'bridges' the touch-wires TWS, the touch resistance (RT) causes a change in the flow of current to the summation point, which results in a (proportional) change in the output voltage of the operational amplifier OPA1. The change in output level is approximately equal to the change in input level multiplied by the value of resistor R5 and the value of R5 is so chosen that an adequate amplifier OPA1 output voltage change occurs for the worst-case touch conditions. Under good conditions (i.e. when the touch resistance is considerably less than worstcase) the output voltage change from amplifier OPA1 could be excessive; hence limiting is provided by diodes D1 and D2. These two diodes are used in series, a) to provide a larger change in output voltage before limiting takes place, and b) to ensure that the reverse biased resistance is very much greater than resistor R5 at the highest operating temperature. Capacitor C4 compensates for the shunt effect of the cable to the touchwires TWS while resistor R4 provides current limiting as a safeguard against the associated touch-wire TWS being inadvertently connected to earth. The presence of this resistor effectively increases the source impedance of the negative potential as far as the touch-wire is concerned, and capacitor C3 has been added to reduce that impedance and, hence, the susceptibility of amplifier OPA1 to 'noise.' Resistor R6 and capacitors C5 and C6 control the frequency response of the operational amplifier OPA1 and maintain stability under "feedback" conditions.

As the amplifier is d.c. coupled throughout, drift occurs with changes in temperature, and compensation is provided by means of a temperature dependent control voltage EC. The sign of the changes in input current, resulting from changes in EC, are such that d.c. drift is reduced. The degree of drift is a function of the operational Amplifier OPA1 bias current, and adjustment of the Sense circuit output level (using $VR_1$) automatically defines the degree of correction applied. For example, if the bias current is greater, a greater proportion of EC is applied to R1 to compensate, and the degree of correction is therefore automatically greater. EC is common to all Sense circuits and resistors R1 and R2 and capacitor C2 provide isolation (by decoupling) within each sense circuit.

Voltage ER2 is a reference potential which is applied to all sense circuits and to the Drift Correction circuit DCC of FIG. 1. This potential raises the Sense circuit operational amplifier OPA1 non-inverting input level, hence point VE is raised positively, (for the example given) with respect to 'earth.' As a potential difference then exists between the touch-wire connected to point VE and 'earth,' this reduces the loss of sensitivity which could otherwise occur if contact is made between the operator (e.g. his other hand) and 'earth,' while one hand is being used to operate the touch-wire equipment.

Resistor R5 is provided to limit the first stage output current, and therefore it protects the operational amplifier OPA1, should the touch-wires be inadvertently shunted together (or to 'earth').

The output from the operational amplifier OPA1 of the first stage is amplified by the second stage formed by operational amplifier OPA2, the closed-loop gain of which is closely defined by negative feedback.

Resistor R7 provides the shift in voltage level necessary, between the output from the first stage amplifier OPA1 and the virtual earth point (VE2) of the second stage amplifier OPA2, and provides the conversion from first stage voltage output to second stage current input. Resistor R8 provides an offset bias to compensate for the standing current through resistor R7.

Resistor R9, in association with resistor R7, defines the closed-loop voltage gain between the output from the first stage amplifier OPA1 and the output from the second stage amplifier OPA2 and also defines the 'resting' level of the output O/P1.

Capacitor C7 provides integration, as a protection against 'noise' while resistor R10 and capacitors C8 and C9 control the frequency response of the amplifier OPA2.

The amplifier OPA2 output level is nominally +5 volts in the "no touch" condition. Diode D3, in association with diode D4, defines the logic level output (O/P1) when a touch is present and the output level is arranged to be earth. The non-inverting input to the second stage is held at earth, hence VE2 is also very close to earth. When a touch occurs, the amplifier output level goes slightly negative with respect to earth allowing diode D3 to conduct giving a powerful clamping action by reducing the feedback resistance. The voltage drop across diode D3 is very similar to that across diode D4, under these conditions, hence the output level is very close to VE2 (earth).

The amplifier output voltage may exceed the maximum permissible positive logic level under 'no touch' conditions and during power-switching periods. Diode D5, in association with diode D7 and D8, ensure that the output level is not excessively positive under such conditions. Capacitor C10 also provides protection for the digital circuitry under switch-off conditions, by absorbing any transient conditions caused by the diode storage effects. Diode D6 and R12 form part of the Fault circuit input gate, and will be referred to in association with that circuit (FIG. 4).

ADVERSE ENVIRONMENT

The arrangement described above is adequate for clean, dry, environments.

For adverse conditions, however, a 'guard' wire GL may be added between the conductors of the touch wire TWS shown in FIG. 2. This third conductor is connected to ER2, and is so mounted that is cannot be touched.

The principle of operation may best be described in association with FIG. 6.

Without the third conductor added, leakage between TWS *a* and *b* may be equivalent to a touch (or partial touch). With the third conductor added, however, it will be seen that leakage between point *b* and the added conductor will have virtually no effect as it simply represents a load on ER2 and the negative supply potential, both of which are arranged to have a low source impedance. The leakage path resistance would need to be sufficiently low for the voltage drop across R to become significant, and R is arranged to be of the order of 1KΩ. Leakage between the added wire and '*a*' will also have little effect because ER2 potential is not more than 10 mV different from that at VE, by design, and therefore the effective current change produced by the leakage is very small.

DRIFT CORRECTION (FIG. 3)

As the Sense circuit of FIG. 2 is entirely d.c. coupled, drift occurs. This is primarily due to the variation in inverting-input bias current with temperature. Consideration will show that if the bias current of the first stage operational amplifier OPA1 of the Sense circuit reduces with increasing temperature, then the first stage output level will drift negatively.

Partial compensation for drift is provided by the Drift Correction circuit DCC of FIG. 1 which is shown in more detail in FIG. 3. This circuit utilizes a similar operational amplifier OP package to that used in the sense circuit and EC will therefore change in a similar 'direction' to the output from the first stage OPA1 of the Sense circuit. A proportion of ECC is applied to the sense circuit, via a resistor, by adjustment of VR1 (FIG. 2), and the resulting changes in current are summed together with the changes produced by the Sense circuit. Hence, if EC changes negatively with increased temperature, the output voltage from the first stage will tend to rise positively, thus opposing the change due to variation in Sense circuit bias current with temperature.

The degree of correction required is a function of the magnitude of the input current of the sense circuit operational amplifier OPA1, that is the greater the current at a specified temperature, the greater the change in current with temperature and, hence, the greater the correction required. The adjustment of VR1 necessary to define a specific output level is defined primarily by the magnitude of the first stage of amplifier bias current. The greater the bias current the nearer VR1 'slider' must be moved towards EC, hence, the greater the degree of correction provided.

Resistor RF (FIG. 3) defines the magnitude of the change in EC with temperature. Hence it is adjusted to suit the characteristics of the specific operational amplifier OPAC package used in the drift correction circuit. Resistor VRi (FIG. 3) controls the magnitude of potential EC relative to reference potential ER2 at a specific temperature. It is apparent, therefore, that the magnitude of Δ EC relative to EC defines the maximum degree of correction provided by the arrangement. Reference potential ER2 is derived from a zener diode ZD, and is common to all sense circuits, and to the Drift Correction circuit DCC. Capacitor Ci and Cf provide protection against noise.

FAULT CIRCUIT (FIG. 4)

To simplify testing, diode D9 and resistor R14 of the fault detection circuit FD in FIG. 4 are normally mounted adjacent to the sense circuits. Hence diode D9 and resistor R14 of FIG. 4 equate to diode D6 and resistor R12 to FIG. 2.

The inputs to the Fault circuits (i.e. the outputs from all the Sense circuits) are normally at +5 volts hence diodes D9, D10 etc. to DN are conducting, while diodes D11, D14 etc. to DM etc. are reverse biased. The inverting input potential to the amplifier OPAF is virtually identical to the non-inverting input potential, which is held at +2 volts. Resistor R16 provides an offset current which, in association with R17, the feed back resistor for the operational amplifier OPAF, holds the output voltage EO normally negative with respect to earth. Hence D6 is reverse biased. The fault detector circuit output level on lead FO/P under these conditions is therefore defined by diodes D13 and D14. Diode D13 is forward biased, and the voltage drop across diodes D13 and D14 is arranged to be similar.

Consider now two sense circuits, the outputs from which are connected to diodes D9 and D10 respectively. If a single touch occurs, the voltage level applied to diode D9 for example will fall from +5 volts to earth and diode D11 will conduct and diode D9 will be reverse biased. The resulting current change to the summation point of the operational amplifier OPAF will cause its output voltage EO to rise positively to approximately earth, but the Fault detector output on lead FO/P will be unaffected. If a double touch occurs, however, the sum of the currents through resistors R14 and R15 will be sufficient to cause EO to rise positively with respect to earth, and the Fault detector output voltage on lead FO/P will rise to approximately +3.5 volts. Over-voltage protection is provided by diodes D14, D15, D16 and zener diode D17. Capacitors C11 and C12 together with resistor R18 ensure stability under feedback conditions while diodes D18 and D19 prevent the output voltage EO of the amplifier OPAF from rising excessively should more than two touches occur simultaneously.

DIGITAL LOGIC CIRCUITRY (FIG. 5)

"Linear to Binary" conversion is by direct logic and the encoded data output signals A B C D and E from the converter L/B CONV (of FIG. 1) are applied to the input gates of the Staticiser formed of toggles DTA to DTE and to a gate GTD which effectively performs an OR function. The output from gate GTD is applied to a monostable TM arranged to produce a nominal, say 15 m secs., delay. If a touch occurs, the output from gate GTD goes to a + v level to start the monostable. The monostable design is such that it is unaffected by further changes in input level unless the O/P pulse has ended and the input has also returned to its normal earth level.

The end of the monostable output pulse produces a "-Staticise data" pulse from gate GSD which transfers the encoded data on leads A to E from the linear to binary converter (L/B CONV. FIG. 1) to the Staticiser bi-stables DTA to DTE in FIG. 5 and primes the data ready bistable DRT. The purpose of the monostable is primarily to ensure that the touch pulse has been maintained for a specified period. If the touch pulse duration is less than that specified for example if the output from gate GTD has returned to earth before the Monostable output pulse ends, then the "staticise Data" pulse from gate GSD is inhibited.

When the touch ends the data ready bistable DRT is set by the + v level output condition from inverter ITD. The equipment receiving the data responds to the data ready signal on lead DR by producing output control signal OPC which causes the state of toggles DTA to DTE to be applied to leads DBA to DBE. The data ready bistable DRT is reset by a pulse on lead RR from the equipment receiving the data.

In order to provide protection against 'jitter' as the finger is removed from the touch-point, the input to the monostable TM is "locked" by a retouch control toggle RTT which is reset from the reset lead RR or the insertion reset lead INSR.

If more than one touch occurs simultaneously, the output from the fault circuit FD of FIG. 1, and lead FO/P of FIG. 4, assumes a + v level which sets the fault bistable FT. The set state of the fault toggle FT prevents the data ready bistable DRT from being set. The fault bistable FT is reset by the leading edge of the monostable IM output pulse via differentiator circuit DF at the commencement of The next touch.

From the above description it can be seen that the current-drive principle used enables the touch-wires to be remote from the sense circuit. Considerable discrimination against noise is inherent in the design. Adjustment is extremely simple, and may be carried out 'on the bench' (and thereafter is only required at very infrequent intervals). The arrangement does not cause any radio frequency interference.

Typically the operational amplifiers employed may be integrated circuit types for example amplifiers given the code of SN72904. The circuitry of FIG. 5 may be fabricated using integrated circuits of the SN54 or SN74 series.

The above description has been of one embodiment only and is not intended to be limiting thereto. Many alterations to the circuitry of the invention will be apparent to those skilled in the art, for example positive logic has been assumed throughout however negative logic could be employed by suitable voltage level adjustments.

What we claim is: 12

1. An electrical device for sensing the application of human touch to a touch contact in which said touch contact is formed by a pair of electrically separated conductors, one of which is connected, as a virtual earth point, to one input of a two input operational amplifier, whereas the other of said conductors is connected to a source of potential while the other input of said operational amplifier is connected to a reference bias source, and in which said operational amplifier is operated in current summation mode to detect the current change resulting from the activation of said touch contact, by the application of an electrical resistive component of a human finger or the like across said pair of conductors, said operational amplifier being arranged to provide a discrete output voltage level on an output lead indicative of said current change.

2. An electrical device for sensing the application of human touch to a touch contact as claimed in claim 1, in which a third conductor is provided mounted in between said pair of conductors and electrically separated therefrom and connected to said other input of said operational amplifier.

3. An electrical device for sensing the application of human touch to a touch contact as claimed in claim 1, in which a temperature dependent control potential correction circuit is connected to one end of a variable resistor the other end of which is connected to said reference bias potential source and the slider of said variable resistor is connected, by way of an isolation circuit, to said virtual earth point.

4. A touch-wire assembly comprising a plurality of touch contacts each having associated therewith an individual electrical device for sensing the application of human touch thereto each touch contact being formed of a pair of electrically separated conductors, one of which is connected as a virtual earth point, to one input of an associated two input operational amplifier, whereas the other of said conductors is connected to a source of potential while the other input of said associated operational amplifier is connected to a reference bias source said associated operational amplifier being operated in current summation mode to detect the current change resulting from the activation of said touch contact and to provide a discrete output voltage level on an associated output lead wherein the associated output lead from each of said electrical devices is separately applied to digital equipment means arranged to provide on a set of identity leads a binary coded representation of an activated touch contact.

5. A touch-wire assembly as claimed in claim 4 wherein said output leads are also applied, by way of a summation means, to one input of a differential amplifier, the other input of which is connected to a source of fixed reference potential, said differential amplifier being arranged to produce a fault indicating output condition when more than one of said devices concurrently produces said discrete output voltage level.

* * * * *